United States Patent [19]

Ohki

[11] Patent Number: 5,262,975

[45] Date of Patent: Nov. 16, 1993

[54] SERIAL INPUT MULTIPLIER APPARATUS

[75] Inventor: Mitsuharu Ohki, Tokyo, Japan

[73] Assignee: Sony Corporation, Tokyo, Japan

[21] Appl. No.: 830,849

[22] Filed: Feb. 4, 1992

[30] Foreign Application Priority Data

Feb. 12, 1991 [JP] Japan .................................. 3-018939
Feb. 12, 1991 [JP] Japan .................................. 3-018940

[51] Int. Cl.⁵ .................................................. G06F 7/52
[52] U.S. Cl. ................................................... 364/757
[58] Field of Search ...................... 364/715.01, 724.16, 364/748, 754, 757, 759, 760

[56] References Cited

U.S. PATENT DOCUMENTS

| | | | |
|---|---|---|---|
| 4,799,182 | 1/1989 | Marwood | 364/748 |
| 4,839,847 | 1/1989 | Laprade | 364/757 X |
| 4,939,687 | 7/1990 | Hartley et al. | 364/757 |
| 5,031,137 | 7/1991 | Elrod | 364/757 |

Primary Examiner—Jerry Smith
Assistant Examiner—Chuong D. Ngo
Attorney, Agent, or Firm—William S. Frommer; Alvin Sinderbrand

[57] ABSTRACT

A serial-input-output multiplying circuit includes AND gates for providing partial products of an input number and a coefficient, a plurality of full adders supplied at input portions thereof with the partial products, unit delay elements for supplying carry outputs of the plurality of full adders to the input portions of the same full adders, and variable delay circuits for supplying sum outputs of the full adders to the input portions of following adders, wherein the product of the input number and the coefficient is serially obtained as a sum output of the full adder for the least significant digit.

4 Claims, 14 Drawing Sheets

FIG. 5A Input (PRIOR ART)

I0, I1, I2, I3, I4, I5, 0, 0, 0, 0, 0, 0, 0, J0, J1, J2, J3, J4, J5, 0

FIG. 5B Output (PRIOR ART)

O0, O1, O2, O3, O4, O5, O6, O7, O8, O9, O10, O11, P0, P1, P2, P3, P4, P5, P6

1 Cycle t →

F I G. 6
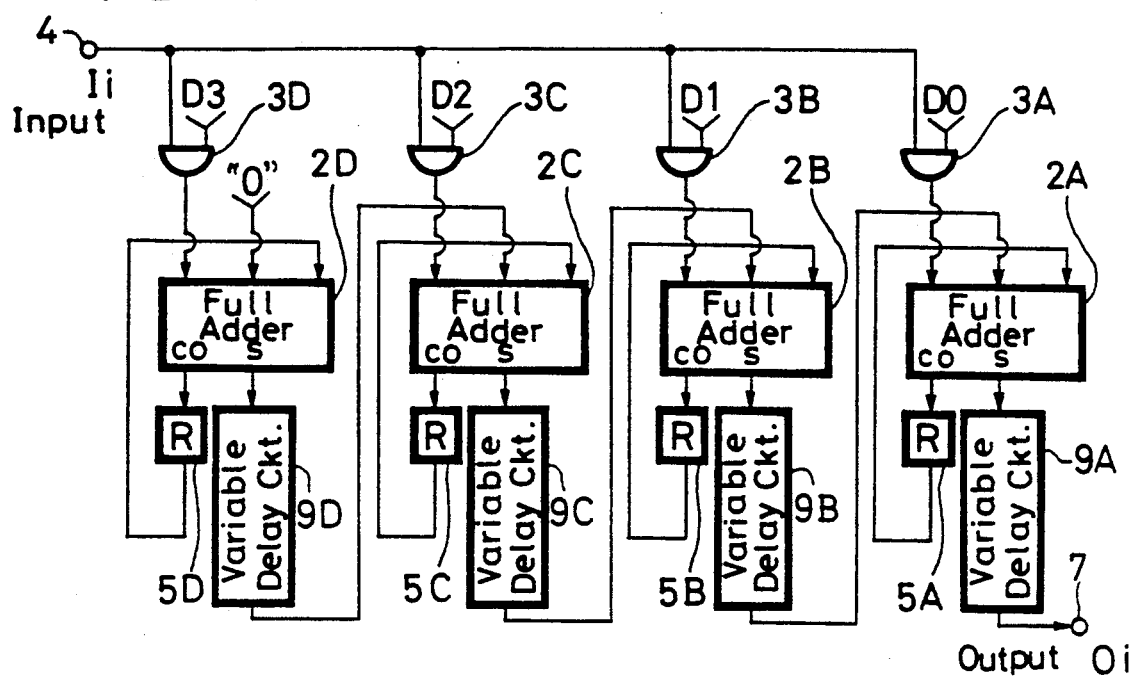
F I G. 7
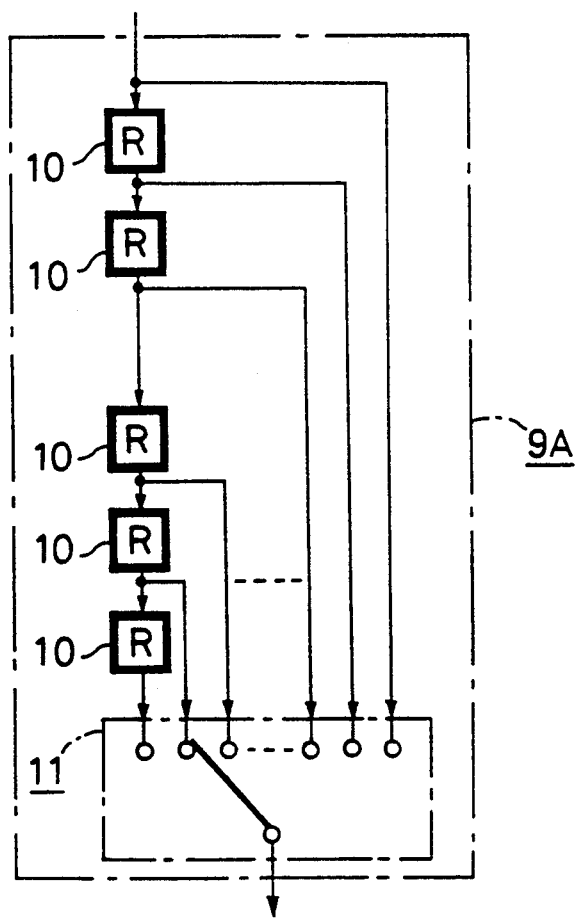

F I G. 12
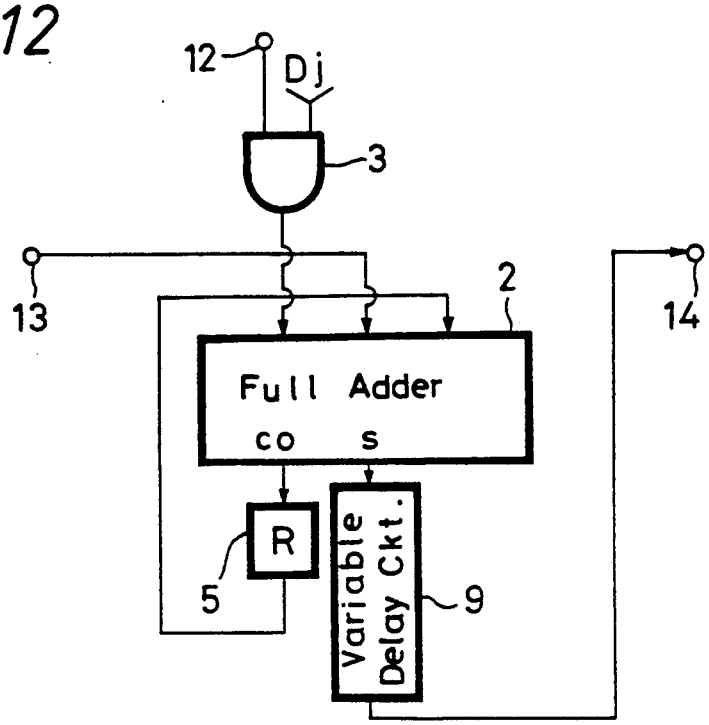
F I G. 13
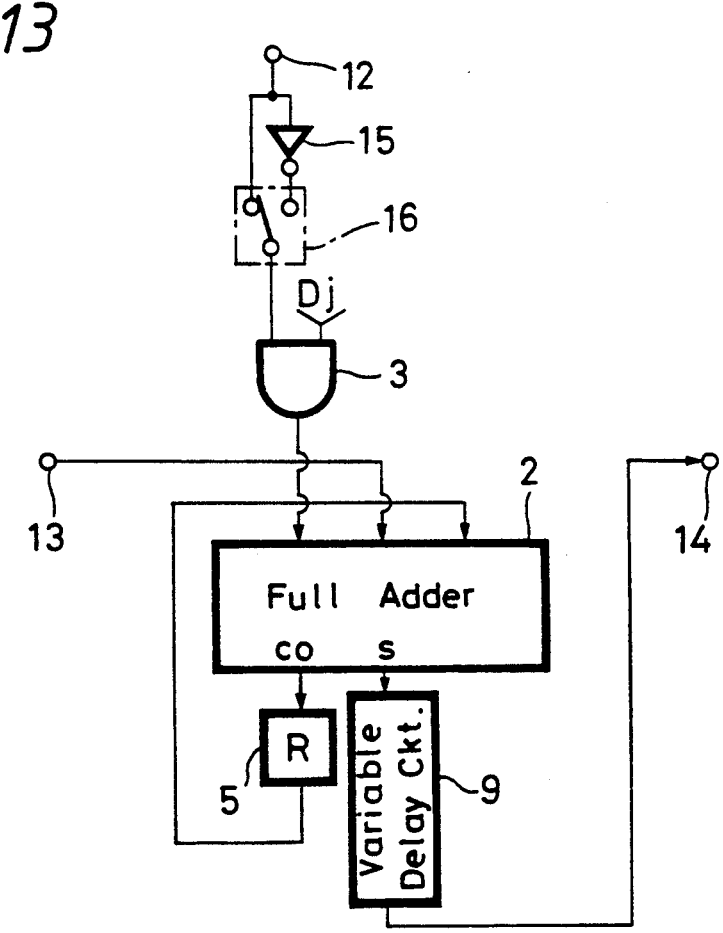

SERIAL INPUT MULTIPLIER APPARATUS

BACKGROUND OF THE INVENTION

1. Field of the Invention

The present invention generally relates to multipliers and, more particularly, is directed to a serial input multiplier apparatus in which a series of digital data serially input and a predetermined coefficient are multiplied to output a series of multiplied result in a digital signal processing apparatus.

2. Description of the Prior Art

There are known multiplying circuits that calculate a product of an input data word I consisting of n bits that are received sequentially and a pre-determined coefficient C also consisting of a plurality of bits. Assuming that the word length of the coefficient C is 7 bits, for example, then the input data word I and the coefficient C are expressed as follows where the most significant bit (MSB) is expressed in the left-hand side:

$$I = (I_{n-1}, I_{n-2}, \ldots, I_0),$$

$$C = (C_6, C_5, \ldots, C_0)$$

In that case, a product 0 of the input data word I and the coefficient C can be expressed as follows:

$$O = (O_{n+6}, O_{n+5}, \ldots, O_1, O_0)$$

The multiplication for calculating this product O is achieved by the addition of partial products as shown in FIG. 1.

FIG. 2 shows in block form a conventional multiplying circuit which is used to execute the calculation shown in FIG. 1.

Referring to FIG. 2, processing units 1A, 1B, 1C, ... all having the same arrangement are supplied with data $I_k$, $I_{k+1}$, $I_{k+2}$, ... representing respective bits of the input data word I and output data $O_k$, $O_{k+1}$, $O_{k+2}$, ... of respective bits of the product O. The processing unit 1A, for example, comprises seven full adders 2A through 2G and seven AND gates 3A through 3G. Data C0 to C6 of the coefficient C are respectively supplied to one input terminal of the AND gates 3A through 3G and data $I_k$ is commonly supplied to the other input terminal of the AND gates 3A through 3G. The full adders 2A through 2F are respectively supplied at their input portions with the outputs of the AND gates 3A through 3F, sum outputs of the processing units of the preceding stage and carry outputs. The full adder 2G for the most significant digit is supplied at its input portion with an output of the AND gate 3G, data "0" and a carry output of the most significant digit from the processing unit of the preceding stage.

Further, the multiplying circuit of FIG. 2 is constructed by the repetition of the processing unit 1A so that, if the processing unit IA is used in a time division manner, then the multiplying circuit can be miniaturized. If the processing unit is utilized in a time division fashion, then respective bits of the input data I are serially input and respective bits of the product O which are the multiplied result are output serially.

FIG. 3 shows in block form a conventional multiplying circuit which inputs and outputs data serially in one such time division fashion. In FIG. 3, like parts corresponding to those of FIG. 2 are marked with the same references and therefore need not be described in detail. In this multiplying circuit shown in FIG. 3, data C0 to C6 representing respective bits of the coefficient C are respectively supplied to one input terminal of the AND gates 3A through 3G and outputs of the AND gates 3A through 3G are respectively supplied to one input terminal of the full adders 2A through 2G. The other input terminals of the AND gates 3A through 3G are commonly connected to an input terminal 4 and a sum output terminal of the full adder 2A of the least significant digit is connected to an output terminal 7. Carry outputs of the full adders 2A through 2G are respectively fed through one clock delay registers 5A through 5G back to the other input terminals of the same adder and sum outputs of the full adders 2B through 2G are respectively supplied through one clock delay registers 6B through 6G to the remaining input terminals of the full adders 2A through 2F for the next lower digit. The multiplying circuit shown in FIG. 3 is described, for example, in page 62 and FIG. 4.2 of "APPLICATION OF DIGITAL SIGNAL PROCESSING" written by Nobuo Inoue and published by the Institute of Electronics and Communication Engineers of Japan.

In the example of FIG. 3, from the input terminal 4 respective bits $I_i$ of input data word word I are supplied in the sequential order of $I_0$ in the first cycle, $I_1$ in the second cycle, ..., $I_{n-1}$ in the n'th cycle to the AND gates 3A through 3G and respective bits of product O are output from the output terminal 7 in the sequential order of O0 in the first cycle, O1 in the second cycle, ..., $O_{n+6}$ in the (n+7)'th cycle. To be more concrete, if the coefficient C is set as follows:

$$C = (C_6, C_5, C_4, C_3, C_2, C_1, C_0)$$
$$= (1100101)$$

then the circuit shown in FIG. 3 is simplified and becomes equivalent to a circuit shown in FIG. 4. More specifically, in the circuit shown in FIG. 4, although the respective input terminals of the full adders 2A, 2C, 2F and 2G of digits in which the bit Ci of the coefficient C is "1" in the circuit of FIG. 3 are connected to the input terminal 4, the respective input terminals of the full adders 2B, 2D and 2E of digits in which the bit Ci of the coefficient C is "0" are not connected to the input terminal 4.

Accordingly, although the four full adders 2A, 2C, 2F and 2G execute useful processing for adding bit $I_i$ of input data word I supplied thereto through the input terminal 4, the remaining three full adders 2B, 2D and 2E perform useless processing for adding "0" instead of adding data $I_i$ representing respective bits of the input data word I.

In order to generalize the aforementioned fact, assuming that the coefficient C is m bits and that m1 bits of "1" and m2 (m2=m−m1) bits of "0" exist among the bits Ci of the coefficient C, then it is to be noted that m2 full adders out of m full adders within the circuit of FIG. 4 perform useless processing. If the full adders, which do not perform useful processing, are removed, then the circuit scale of the multiplying circuit can be miniaturized more and the multiplying circuit can be made more inexpensive.

Further, the above-mentioned multiplying circuit needs a calculation time corresponding to the number of cycles equal to the word length of the resultant product.

More specifically, assuming that the word length of input data words I, J, K, ... is 6 bits and that the word length of the coefficient C is 6 bits, then the word length of the products O, P, Q, . . . is 12 bits. Therefore, the input data word I, the coefficient C and the product O can be expressed in a binary numeral fashion as follows where the bit (MSB) of the most significant digit is provided on the left-hand side.

$$I = (I5, I4, I3, I2, I1, I0)$$

$$C = (C5, C4, C3, C2, C1, C0)$$

$$O = I \times C = (O11, O10, O9, \ldots, O1, O0) \quad (1)$$

Similarly, input data word J can be expressed as (J5, J4, . . . , J0) and product P also can be expressed as (P11, P10, . . . , P1, P0). Therefore, input data words and products will hereinafter be expressed in a binary numeral fashion.

In that case, according to the prior art, respective bits of input data words I, J, . . . , must be supplied in a format so that a dummy bit formed of six "0", is interposed therebetween as shown in FIG. 5A. The reason for this will be described below. That is, since the conventional multiplying circuit for multiplying the numbers of word length of 6 bits is formed such that six full adders are connected in series via delay circuits, after an MSB of an input data word I is input to the leftmost full adder, a time period of six cycles is needed before a calculated result is output to the output terminal through the delay circuits, full adders provided on the right of the delay circuit, etc. Therefore, the next data cannot be input during that period. This conventional multiplying circuit generates at its output terminal respective bits such as O, P or the like sequentially in response to FIG. 5A as shown in FIG. 5B.

However, the dummy bits must be inserted between input data I, J or the like as shown in FIG. 5A and there is then the disadvantage such that a signal line (bus) for transmitting input data cannot be utilized effectively. Furthermore, although the data rate of the input data is the same as the very time of the calculation in such multiplying circuit, the insertion of the dummy bits increases the calculation time considerably.

OBJECTS AND SUMMARY OF THE INVENTION

Accordingly, it is an object of the present invention to provide an improved serial input multiplier apparatus in which the aforesaid shortcomings and disadvantages encountered with the prior art can be eliminated.

More specifically, it is an object of the present invention to provide a serial input multiplier apparatus in which the number of full adders can be reduced.

Another object of the present invention is to provide a multiplier apparatus in which the circuit scale can be further miniaturized.

A further object of the present invention is to provide a multiplier apparatus in which the processing speed can be increased.

According to a first aspect of the invention, a serial-input-output multiplying circuit is provided for multiplying an input number by a coefficient to form a product number. The circuit includes a serial input terminal for serially receiving bits of the input number and a serial output terminal for serially outputting bits of the product number. The circuit also includes a plurality of AND gates, each having a first input connected to the serial input terminal and the second input which receives a signal representative of a respective bit of the coefficient. Each AND gate thereby provides at its output a partial product of the input number and the coefficient. The circuit also includes a like plurality of full adders for combining the partial products. The adders are arranged in a serial including a least significant bit (LSB) adder as the last adder of the series. Each adder has a first input connected to the output of a respective one of the AND gates. The circuit also includes a like plurality of unit delay elements, each of which is connected between a carry output and a second input of a respective one of the full adders. The circuit also includes a like plurality of variable delay circuits. One of the variable delay circuits connects a sum output of the LSB adder to the serial output terminal and the other variable delay circuits each connect a sum output of a respective one of the other full adders to a third input of a next full adder of the serial.

According to a second aspect of the invention, there is provided a serial-input-output multiplying circuit for multiplying an input number by a coefficient to form a product number. The circuit includes a serial input terminal for serially receiving bits of the input number and a serial output terminal for serially outputting bits of the product number. The circuit also includes a variable delay circuit having an input coupled to the serial input terminal and plural groups of outputs. The variable delay circuit also includes a plurality of unit delay elements connected in cascade. The multiplying circuit according to the second aspect also include a plurality of means for selecting a delay to be provided by the variable delay circuit, each of the means being connected to a respective one of the groups of outputs. The multiplying circuit also includes a plurality of AND circuits, each of which has one input connected to a respective one of the delay selective means. Each AND circuit receives at its other input a signal representative of a respective bit of the coefficient. The multiplying circuit also includes a plurality of full adders arranged in a series including a least significant bit (LSB) adder as the last adder of the series. Each of the full adders has a first input connected to receive an output from a respective one of the AND circuits. The LSB adder has its sum output connected to the serial output terminal. The multiplying circuit also includes a plurality of unit delay elements, each connected between a carry output and a second input of a respective one of the full adders, and another plurality of unit delay elements, each connected between a sum output of a respective one of the full adders and a third input of a next full adder of the series.

According to a third aspect of the invention, there is provided a serial-input-output multiplying circuit for multiplying an input number by a predetermined coefficient to form a product number The circuit includes a serial input terminal for serially receiving bits of the input number, a first serial output terminal for serially outputting low order bits of the product number, and a second serial output terminal for serially outputting high order bits of the product number. The circuit also includes a plurality of AND gates, each having a first input connected to the serial input terminal and a second input which receives a signal representative of a respective bit of the predetermined coefficient. Each of the AND gates thereby provides at its output a partial product of the input number and the predetermined coefficient. The multiplying circuit according to the third aspect also includes a like plurality of full adders for combining the partial products. The adders are arranged in a series including a least significant bit (LSB) adder as the last adder of the series. Each adder has a first input connected to the output of a respective one of the AND gates. The LSB adder has its sum output connected to the first serial output terminal to provide the low order bits. The multiplying circuit also includes a like plurality of unit delay elements, each connected between a carry output and a second input of a respective one of the full adders. The circuit further includes a plurality of delay circuits, each connecting a sum output of a respective one of the full adders other than the LSB adder to a third input of a next full adder of the series. The multiplying circuit also includes an additional full adder for receiving and adding the sum outputs and carry outputs of the plurality of full adders. The additional full adder has its carry output connected through a unit delay elements to one of its inputs and has its sum output connected to the second serial output terminal to provide the high order bits.

The preceding and other objects, features, and advantages of the present invention will become apparent in the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 5A and 5B are respectively timing charts used to explain the conventional serial input multiplying circuit shown in FIG. 3;

FIG. 6 is a schematic block diagram showing an arrangement of a multiplying circuit according to a first embodiment of the present invention;

FIG. 7 is a block diagram showing an example of a variable delay circuit used in the first embodiment of the multiplying circuit shown in FIG. 6;

FIG. 12 is a schematic block diagram showing a fundamental unit of the multiplying circuit according to the first embodiment of the present invention shown in FIG. 6;

FIG. 13 is a schematic block diagram showing a modified example of the fundamental unit of the present invention shown in FIG. 12;

DETAILED DESCRIPTION OF THE PREFERRED EMBODIMENTS

A first embodiment of a serial input multiplying circuit according to the present invention will hereinafter be described with reference to FIGS. 6 to 12. In this embodiment, the present invention is applied to a multiplying circuit in which input data word I of word length n bits (n is an integer larger than 2) serially input starting with the LSB (least significant bit) and a coefficient C of word length m bits (m is an integer of 4 or more) are multiplied with each other to obtain a product O of word length (n+m) bits and respective bits of the product O are serially output from the LSB. Providing the MSB on the left-hand side, the input data word I, the coefficient C and the product O can be expressed as follows:

$$I = (I_{n-1}, I_{n-2}, \ldots, I_0)$$

$$C = (C_{m-1}, C_{m-2}, \ldots, C_0)$$

$$O = (O_{n+m-1}, O_{n+5}, \ldots, O_1, O_0) \quad (2)$$

In this embodiment, assuming that at most four bits of coefficient C have the value "1", then four bits which may be "1" are represented as coefficient data D0, D1, D2, D3 in the sequential order of small digit. That is, the coefficient C can be expressed by the use of bits Di as follows:

$$C = (D3, \ldots, D2, \ldots, D1, \ldots, D0, \ldots) \quad (3)$$

In the above-mentioned equation (3), [...] is composed of a series of "0",. For example, if C=(1100101), then D0=D1=D2=D3=1 and if C=(100101), then D0=D1=D2=1, D3=0.

Figure 3:
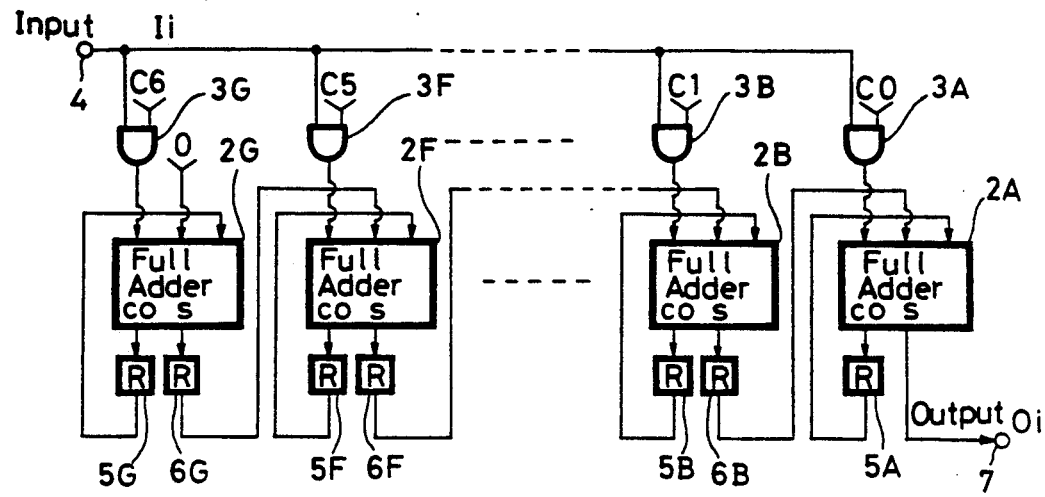
FIG. 3 is a schematic block diagram showing a serial input multiplying circuit according to a second example of the prior art.

FIG. 6 shows a multiplying circuit according to a first embodiment of the present invention. In FIG. 6, like parts corresponding to those of FIG. 3 are marked with the same reference numerals and therefore need not be described in detail. This embodiment employs four full adders 2A to 2D the number of which corresponds to that of coefficient data Di and four AND gates 3A through 3D. Respective bits Ii of the input data word I are serially supplied through the input terminal 4 to one input terminal of the AND gates 3A to 3D and coefficient data D0 to D3 are respectively supplied to the other input terminal of these AND gates 3A to 3D. Outputs of the AND gates 3A through 3D are respectively supplied to one input terminal of the full adders 2A through 2D. Carry outputs of the full adders 2A through 2D are fed through registers 5A through 5D, each of which is provided as a unit delay element, back to another input terminal of the same adder. Sum outputs for the three most significant digits from the full adders 2B to 2D are respectively supplied through variable delay circuits 9B to 9D to the remaining input terminals of the full adders 2A to 2C for the next lower digit and data "0" is supplied to the remaining input terminal for the most significant of full adder 2D of the digit. A sum output of the full adder 2A for the least significant digit is successively supplied through a variable delay circuit 9A to the output terminal 7 as respective bits of product Oi.

Each of the variable delay circuits 9A to 9D is of the same arrangement and hence an example of the variable delay circuit 9A is illustrated in FIG. 7. Referring to FIG. 7, registers 10 are respectively provided as unit delay elements. Since the word lengths of the coefficient C and the input data word I to be multiplied therewith are both m bits, m registers 10 are connected in cascade and the sum output of the full adder 2A of FIG. 6 is supplied to the leading register 10. Further, a data selector 11 is designed to select one output from (m+1) inputs. Output data of m registers 10 and the input data to the leading register 10 are respectively supplied to the input terminals of the data selector 11 and an output of this data selector 11 is supplied to the output terminal 7 shown in FIG. 6. In this case, assuming that one clock represents a cycle in which input data is moved bit by bit, then by supplying an control signal to the data selector 11 from the outside, data in which the input data is delayed by 0 to m clocks can be obtained from the variable delay circuit 9A.

Figure 4:
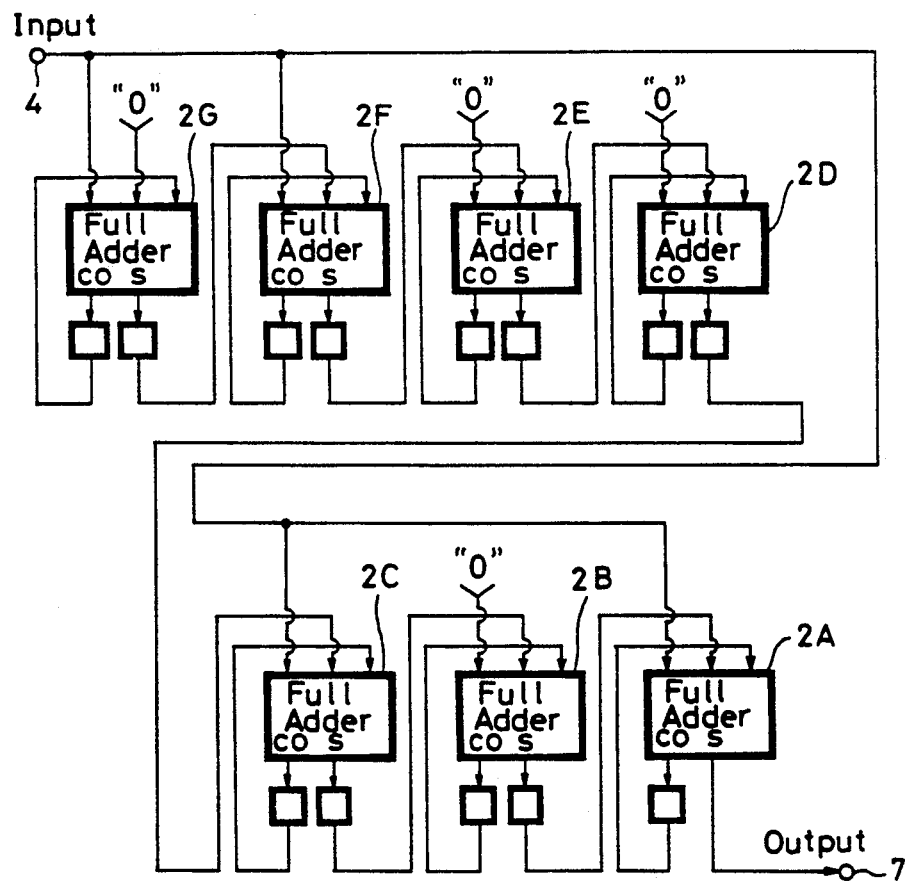
FIG. 4 is a schematic block diagram showing an example of an equivalent circuit of the multiplying circuit shown in FIG. 3.

Operation of the multiplying circuit according to this embodiment will be described below, taking the coefficient C to be (1100101). In this case, D0=D1=D2=D3=1 is set in FIG. 6 and the delay times of the variable delay circuits 9A through 9D are respectively set to 0, 2 clocks, 3 clocks and 1 clock. Therefore, since the AND gates 3A through 3D output input data directly, the multiplying circuit shown in FIG. 6 becomes equivalent to the multiplying circuit shown in FIG. 8. On the other hand, the equivalent circuit in which the coefficient C is set to (1100101) in the multiplying circuit according to the example of the prior art shown in FIG. 3 is represented in FIG. 4. An operation in which the circuit shown in FIG. 8 performs the multiplication of the input data word I and the coefficient C similarly to the circuit shown in FIG. 4 will be described below.

Figure 1:
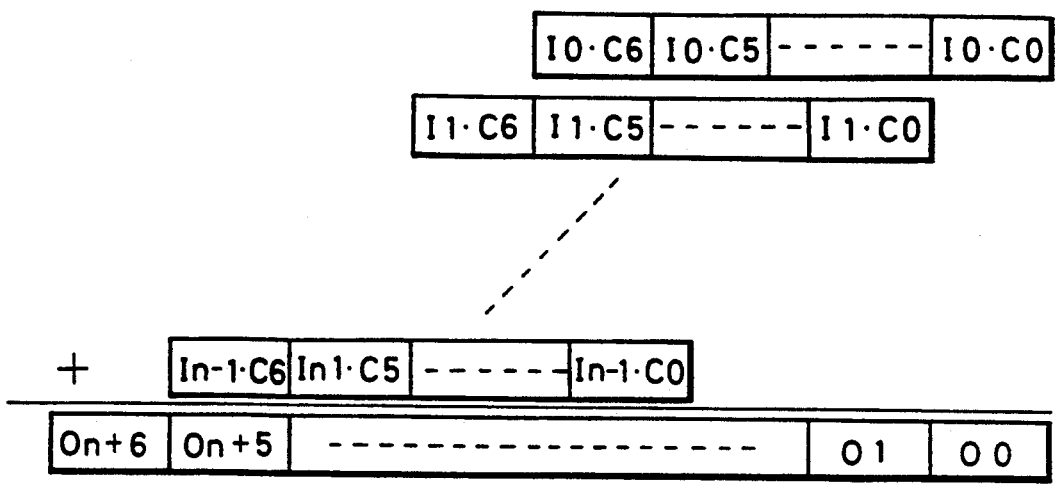
FIG. 1 is a schematic representation used to explain a calculating method of a multiplication circuit according to the prior art.
Figure 2:
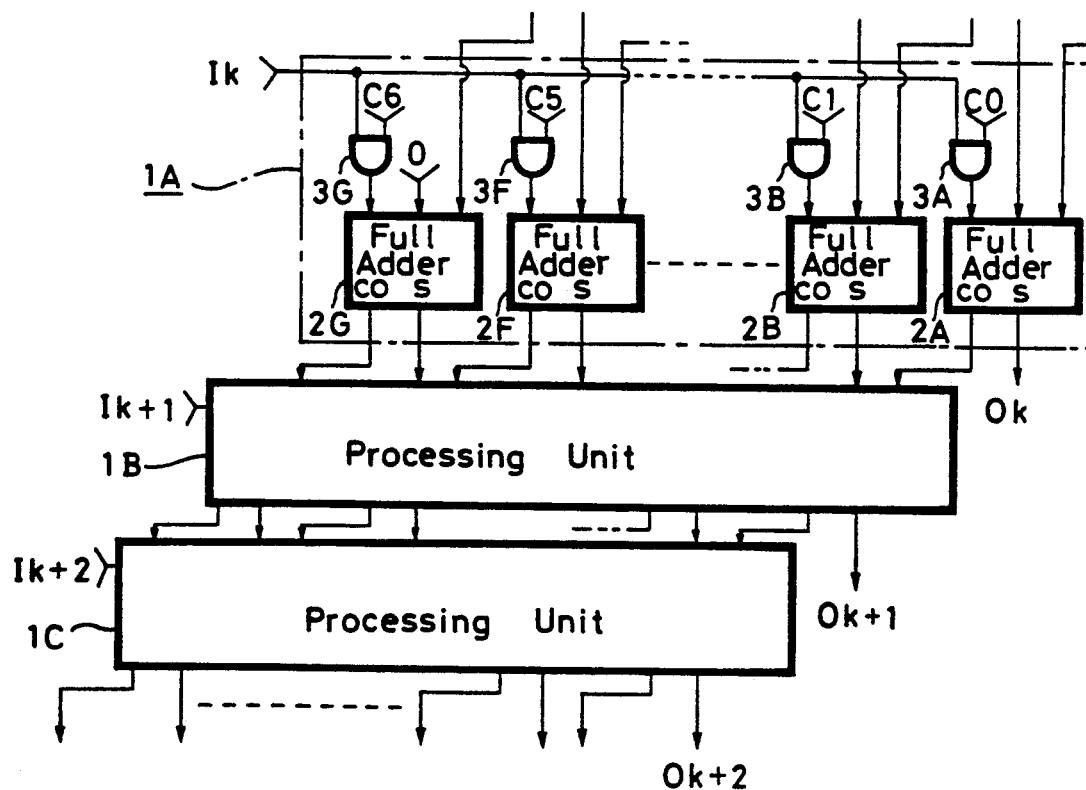
FIG. 2 is a schematic block diagram showing a parallel input multiplying circuit according to a first example of the prior art.
Figure 9:
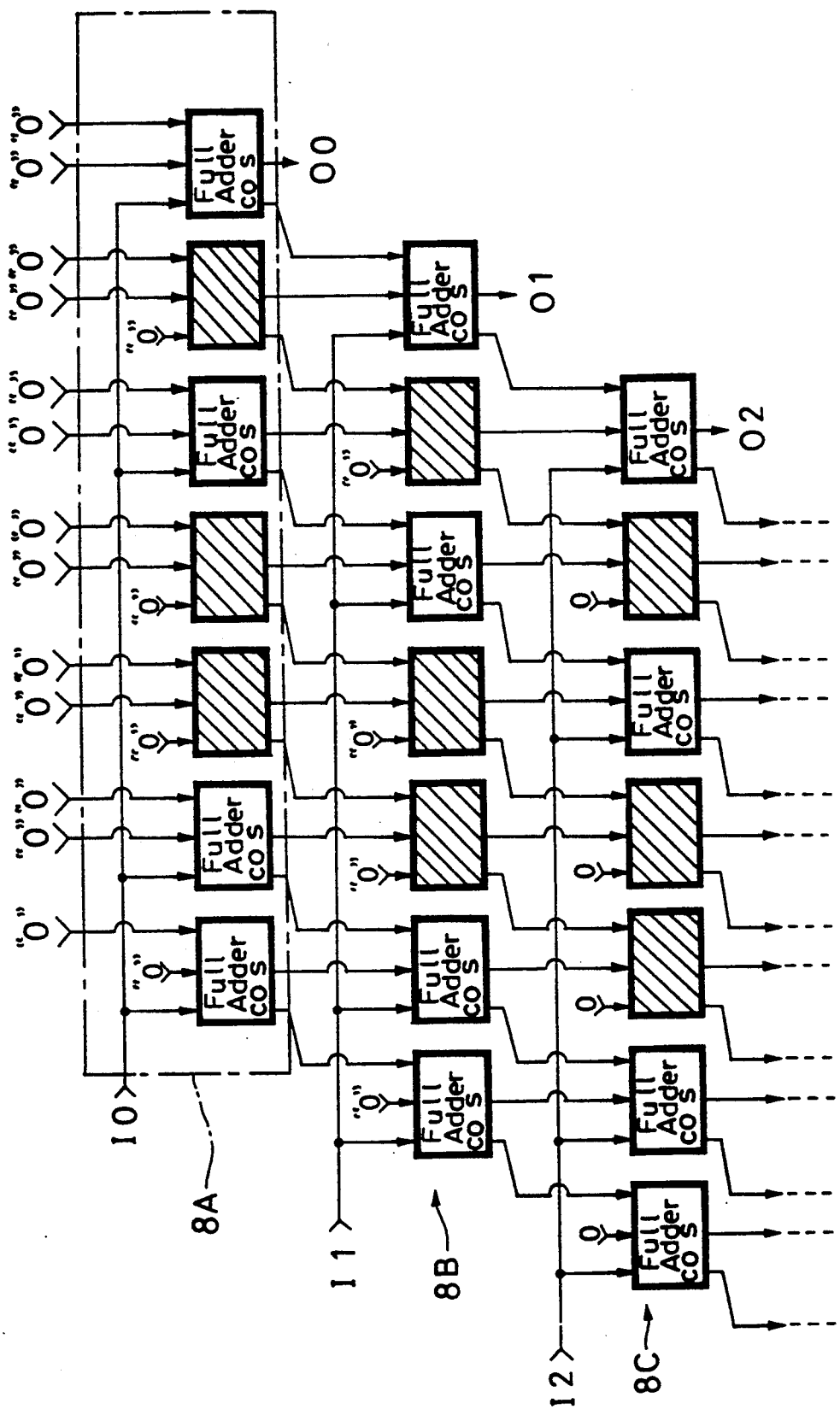
FIG. 9 is a schematic block diagram showing an example of an equivalent circuit of the multiplying circuit according to the first example of the prior art shown in FIG. 2.

The multiplying circuit shown in FIG. 2 is supplied with data I0, I1, ..., In−1 in parallel at the same timing and multiplies the input data with the coefficient C (C=C6, C5, ..., C0). If C=(1100101) is set in this multiplying circuit, then AND gates can be removed so that the first stage portion of the circuit of FIG. 2 is modified as shown in FIG. 9. The multiplying circuit of FIG. 9 is constructed by repeatedly connecting in cascade processing units 8A, 8B, 8C, ..., each of which is composed of seven full adders. Further, since C4=C3=C1=0 in FIG. 9, the three hatched full adders in the processing unit 8A of the first stage do not add the coefficient C to the input data I0 and two data of "0" are supplied to these three hatched full adders as initial values. Consequently, sum outputs and carry outputs of these three full adders are all "0".

In the processing unit 8B of the second stage, since data of "0" are supplied to at least two input terminals of three input terminals of three full adders (hatched full adders in FIG. 9) corresponding to the coefficients C1, C3 and C4, carry outputs of these three full adders are all "0". Similarly, in the processing unit 8C of the third stage, since carry outputs of the three hatched full adders corresponding to the coefficients C1, C3 and C4 are all "0", these full adders directly produce a "1" from their sum outputs corresponding to a "1" supplied to one of their input terminals. More specifically, since the three full adders corresponding to the coefficients C1, C3, C4 of these processing units 8A, 8B, ... produce carry outputs "0" and also produce from their sum output terminals either a "1" or "0" supplied thereto from full adders of the processing unit of the preceding stage, these three full adders can be removed.

Figure 8:
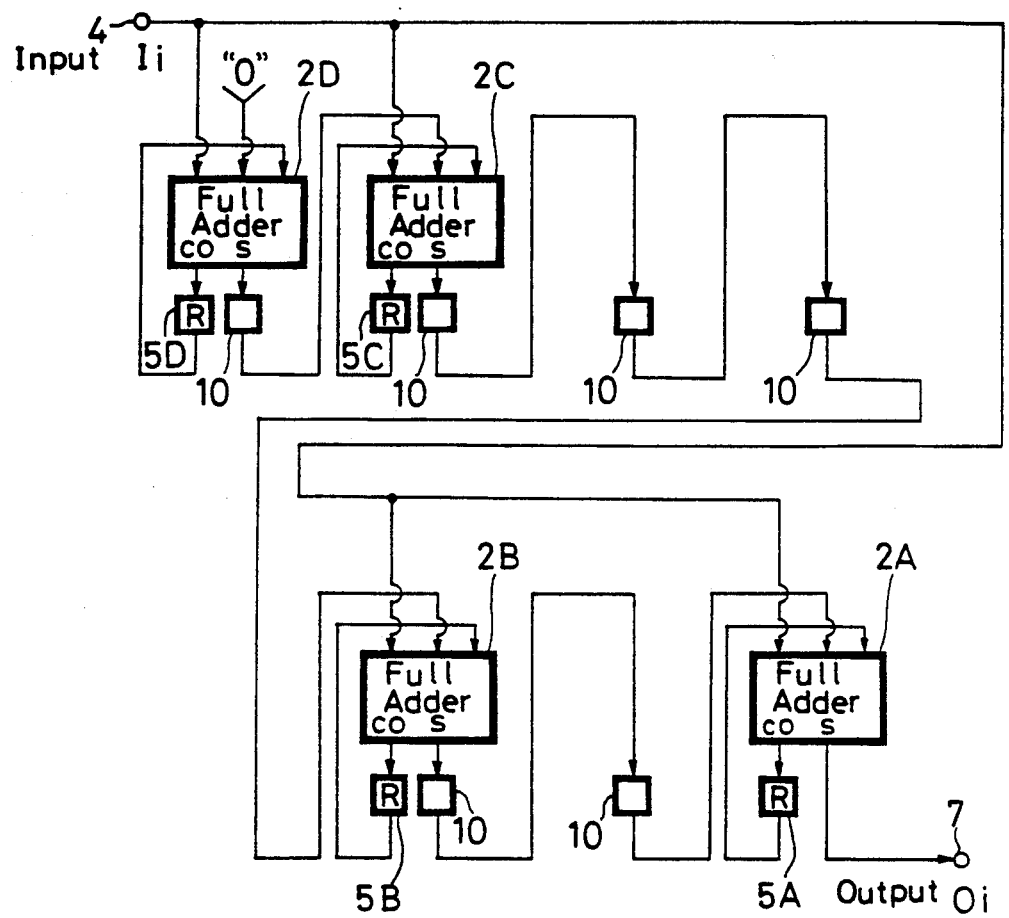
FIG. 8 is a schematic block diagram showing an example of an equivalent circuit of the first embodiment of the multiplying circuit of the present invention shown in FIG. 6.
Figure 11:
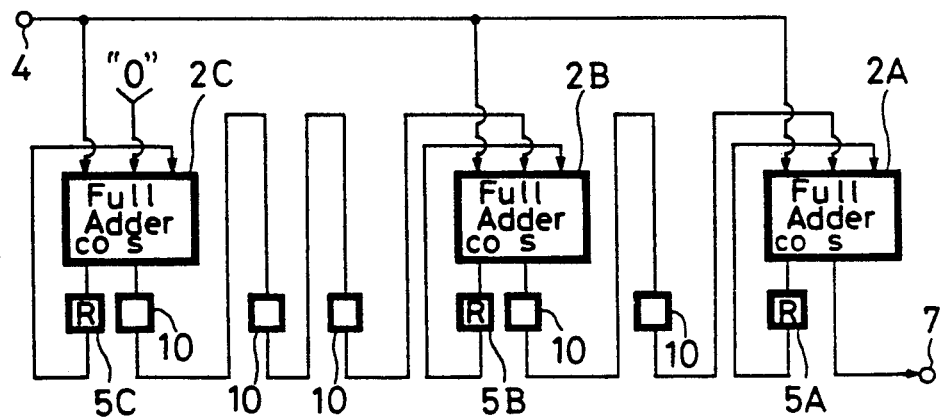
FIG. 11 is a schematic block diagram showing a second example of the equivalent circuit of the multiplying circuit according to the first embodiment of the present invention shown in FIG. 6.
Figure 10:
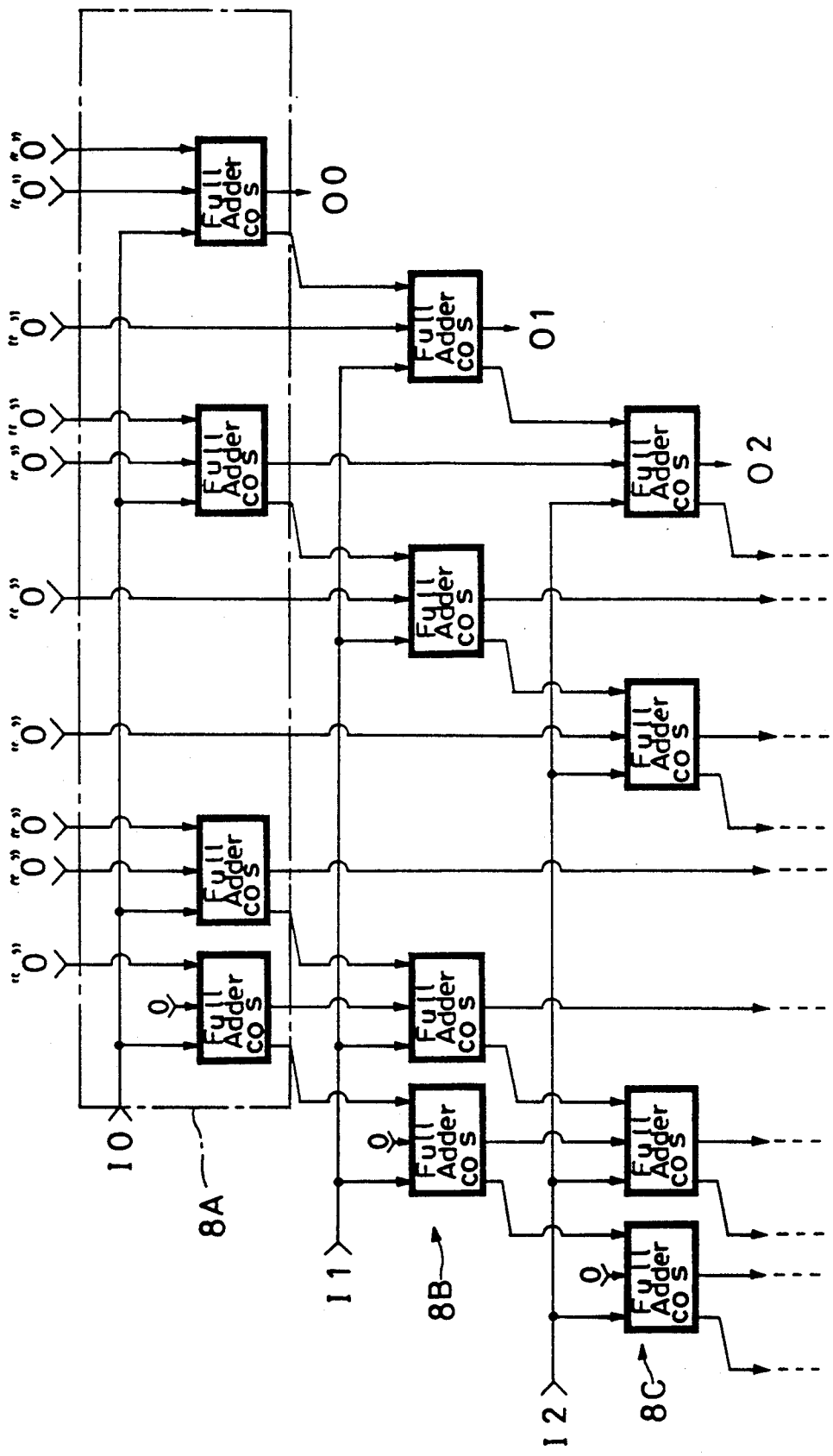
FIG. 10 is a schematic block diagram showing an example of an equivalent circuit of the multiplying circuit according to the first example of the prior art shown in FIG. 2.

FIG. 10 shows a multiplying circuit which results from removing these three hatched full adders from the respective processing units of FIG. 9. Since the multiplying circuit of FIG. 10 is constructed by repeatedly connecting in cascade processing units 8A, 8B, ..., each of which includes four full adders, time division processing can be executed by feeding outputs of the respective full adders through a register back to the input side. FIG. 8 shows a multiplying circuit of this embodiment in which the multiplying circuit of FIG. 10 is converted into a time division circuit. While input data bits I0, I1, ... In−1 are supplied simultaneously to the multiplying circuit of FIG. 10, bits of input data word I are serially supplied in such a manner as to supply input data bit I0 in the first cycle, input data bit I1 in the second cycle, ..., input data bit In−1 in the n'th cycle in the circuit of this embodiment shown in FIG. 8, whereby respective bits Oi of the product O of the input data word I and the coefficient C are output from the output terminal 7 of FIG. 8 in such a way as to supply O0 in the first cycle, O1 in the second cycle, ..., On+6 in the (n+7)'th cycle. Accordingly, the multiplying circuit of FIG. 8 is exactly equivalent to the multiplying circuit with serial input and serial output shown in FIG. 4.

If the coefficient C is (100101), then D0=D1=D2=1 and D3=0 are set and delay times of variable delay circuits 9A through 9D are set to 0, 2 clocks, 3 clocks and 1 clock, respectively, in FIG. 6. At that time, since the AND gates 3A to 3C directly generate their input data and the output of the AND gate 3D goes "0", the multiplying circuit of FIG. 6 becomes equivalent to that of FIG. 11, i.e., the full adder 2D for the most significant digit can be removed. Therefore, the multiplying circuit of FIG. 11 can calculate the product O of the input data word I and the coefficient (100101) in a serial input and output fashion.

Further, if a product of input data word I and coefficient C (=(10110001)) is calculated by the multiplying circuit of FIG. 6, then D0=D1=D2=D3=1 is set and delay times of the variable delay circuits 9A through 9D are set to 0, 4 clocks, 1 clock and 2 clocks, respectively. Similarly, when the number of "1" in the coefficient C is 4 or less, then the product of the input data word I and the coefficient C can be calculated by the multiplying circuit shown in FIG. 6.

To generalize the multiplying circuit shown in FIG. 6, a fundamental unit in the multiplying circuit shown in FIG. 6 is represented in FIG. 12. In the circuit of FIG. 12 provided as the fundamental unit, an AND gate 3 is supplied at its respective input terminals with coefficient data Dj and data input from the outside through an input terminal 12. A full adder 2 is supplied at its first and second input terminals respectively with an output of the AND gate 3 and data supplied from the fundamental unit to the left through a connection terminal 13. A carry output of this full adder 2 is fed through a register (R) 5 back to a third input terminal thereof, and a sum output of the full adder 2 is supplied through the variable delay circuit 9 and a connection terminal 14 to the fundamental unit to the right. If k number of the fundamental units shown in FIG. 12 are provided, then regardless of the word length of the coefficient C, the multiplication with serial input and output can be carried out so long as the coefficient C has no more than k digits that have the value "1".

Generally, there is a probability of 50% that each digit of the coefficient C is "1" or "0" and according to the arrangement of FIG. 6, the number of the full adders can on the average be reduced by half as compared with the prior art.

A fundamental unit, which is provided by modifying the fundamental unit of FIG. 12 as shown in FIG. 13, also can be utilized. In the fundamental unit of FIG. 13, data applied to an input terminal 12 from the outside is supplied to an inverter 15 and one input terminal of a two-input data selector 16, and an output of the inverter 15 is supplied to the other input terminal of the data selector 16. An output of the data selector 16 is supplied to one input terminal of the AND gate 3 and the coefficient data Dj is supplied to the other input terminal of the AND gate 3. The rest of the arrangement of FIG. 13 is similar to that of FIG. 12. According to the fundamental unit shown in FIG. 13, it becomes useful even when a value of a certain bit in the coefficient C is "−1".

More specifically, when the bit Dj is "−1", then the output of the inverter 15 is selected by the data selector 15 and "1" is set as the output of the register 5 provided at the carry output side of the full adder 2 upon reset, thereby an inverted value of the input data and "1" is added. As a result, a value, which results from multiplying the input data by −1, is added to the coefficient. Further, if four fundamental units of FIG. 13 are connected in parallel as shown in FIG. 6, then the input data can be multiplied with, for example, coefficient (011111001111). The reason for this is as follows: The coefficient (011111001111) is the same as coefficient (10000-101000-1) and the latter coefficient involves only four bits which are not "0" so that the former coefficient (011111001111) can be calculated by the multiplying circuit in which four fundamental units of FIG. 13 are connected in parallel.

The multiplying circuit according to a second embodiment of the present invention will hereinafter be described with reference to FIG. 14. Similarly to the example of FIG. 6, this multiplying circuit calculates a product O of input data word I serially input and a coefficient C of word length m bits having four "1", at maximum and serially outputs respective bits of the calculated product O.

Figure 14:
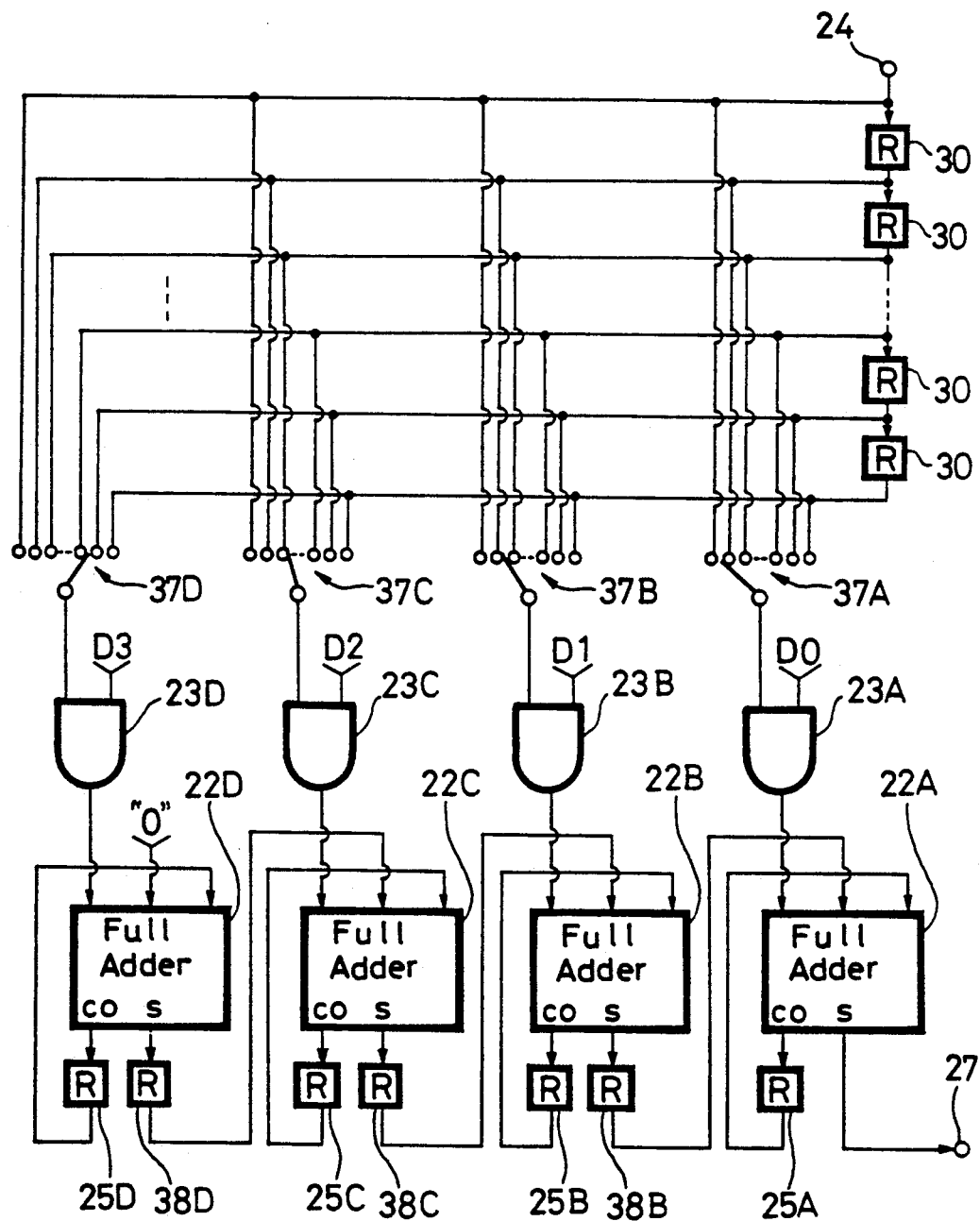
FIG. 14 is a schematic block diagram showing a second embodiment of the multiplying circuit according to the present invention.

FIG. 14 shows the multiplying circuit of this embodiment and as shown in FIG. 14, (m−4) registers 30 are connected in cascade as a unit delay element and an input terminal of the leading register 30 is connected to an input terminal 24. At the input terminal of the leading register 30 and output terminals of the (m−4) registers 30 are developed data which result from delaying input data I received at input terminal 24 from the outside by 0 to (m−4) clocks, respectively. Data selectors 37A to 37D are of (m−3) input-one-output type, and data, which result from delaying the input data I by 0 to (m−4) clocks, are commonly supplied to the first to (m−3)'th input terminals of these data selectors 37A to 37D. Outputs of these data selectors 37A to 37D are respectively supplied to one input terminal of AND gates 23A to 23D and data D0 to D3 representing bits of coefficient C which may be "1" are respectively supplied to the other input terminal of AND gates 23A to 23D.

Also in this embodiment, four full adders 22A to 22D are utilized and sum outputs of the full adders 23B to 23D of the higher digit are respectively supplied through registers 38B to 38D provided as the unit delay element to input terminals of the full adders 22A to 22C for the next lower digit. A product O, which is the sum output of the full adder 22A of the least significant digit is serially supplied to an output terminal 27. The rest of the arrangement of FIG. 14 is the same as that of FIG. 6.

In order to calculate a product of the input data and a coefficient (11000101) by the multiplying circuit of FIG. 14, D0 = D1 = D2 = D3 = 1 is set and data, which result from delaying the input data I by 0, 1 clock, 4 clocks and 4 clocks, are selected by the data selectors 37A to 37D. If they are set as described above, then the multiplying circuit of FIG. 14 becomes equivalent to that of FIG. 8 and thus the multiplying circuit of FIG. 14 can multiply the input data I and the coefficient C similarly to the multiplying circuit of FIG. 8. While the multiplying circuit shown in FIG. 6 can process a variety of coefficients C by respectively changing the delay times in the variable delay circuits 9A to 9D as described above, the multiplying circuit of this embodiment shown in FIG. 14 can process a variety of coefficients C by changing selected data in the data selectors 37A to 37D.

Comparing the circuit scales of the multiplying circuits shown in FIGS. 6 and 14, the variable delay circuits 9A to 9D in the multiplying circuit shown in FIG. 6 are comprised of registers whose number is about 4 times as large as m which is the word length of the coefficient C on the whole, and the number of the registers 30 and the registers 38B to 38D in the multiplying circuit shown in FIG. 14 is about m. Accordingly, the multiplying circuit of FIG. 14 can save about m×3 registers as compared with the multiplying circuit of FIG. 6 and hence the multiplying circuit of FIG. 14 can be miniaturized more.

Further, when the multiplying circuit shown in FIG. 14 is generalized, if the word length of the coefficient C is m bits and k number of "1" s exists within the m bits, then k full adders are utilized, the delay circuits are composed of (m−k) registers and data, which result from delaying the input data I by 0 to (m −k) clocks, are respectively supplied to AND gates connected to the input sides of the respective full adders, thereby constructing a serial input and serial output multiplying circuit. Similarly to the multiplying circuit of FIG. 13, the multiplying circuit shown in FIG. 14 can multiply input data I and the coefficient C having bits of "−1" by adding a circuit formed of an inverter and a data selector to the input portion thereof.

In the above-mentioned embodiment, if the register hold undefined data when the LSB of the input data I is input at the first cycle, then such undefined data is erroneously added by the full adders and therefore values held by all registers must be cleared by a clear signal supplied thereto from the outside in actual practice. While the clear signal may be supplied to all registers at the same timing in the first embodiment shown in FIG. 6, respective registers must be cleared at different times in accordance with the delay times from the input terminal 4 to the full adders in the second embodiment shown in FIG. 14.

According to the multiplying circuits of the first and second embodiments, since full adders of those digits are removed if the coefficient multiplied with the input data involves bits having the value "0", the total number of the full adders utilized can be reduced.

Further, according to the multiplying circuit of the second embodiment, since a plurality of variable delay circuits in the multiplying circuit in the first embodiment can be replaced with a single delay circuit, the circuit scale can be further miniaturized.

Figure 17:
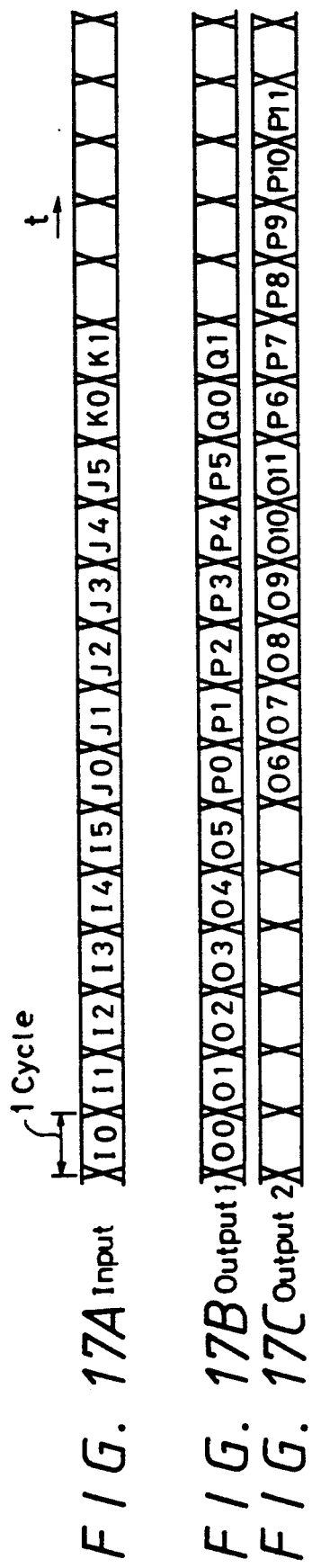
FIGS. 17A through 17C are respectively timing charts used to explain operation of the serial input multiplying circuit according to the third embodiment of the present invention shown in FIGS. 15 and 16.

A serial input multiplying circuit according to the third embodiment of the present invention will be described with reference to FIGS. 15 and 16. In this embodiment, a coefficient C of a predetermined word length, e.g. 6 bits is multiplied with input data words I, J, K, ... of word length 6 bits serially input and resultant products O, P, Q, ... of word length 12 bits are serially output via two output lines. In this case, let it be assumed that input data word I, coefficient C and product O (=I×C) are expressed in a binary numeral fashion by the foregoing equation (2) as:

$$I = (I5, I4, I3, I2, I1, I0)$$

$$C = (C5, C4, C3, C2, C1, C0)$$

$$O = I \times C = (O11, O10, O9, \ldots, O1, O0)$$

and another input data word J, product P and so on can be expressed similarly in a binary numeral fashion. In this embodiment, it is assumed that respective bits of input data words I, J, K, ... are successively supplied as shown in FIG. 17A and the low order 6 bits of products O, P, Q, ... are successively output via one output line in response thereto as shown in FIG. 17B, while higher 6 bits of these products are successively output via the other output line as shown in FIG. 17C.

Further, in this embodiment, it is assumed that the coefficient C involves three bits which may become "1" and that three bits of data are represented as coefficient data D0, D1 and D2 in the order of increasing significance. For example, if C=(110010), then D0=D1=D2=1, while if C=(001001), then D0=D1=1 and D2=0.

Figure 15:
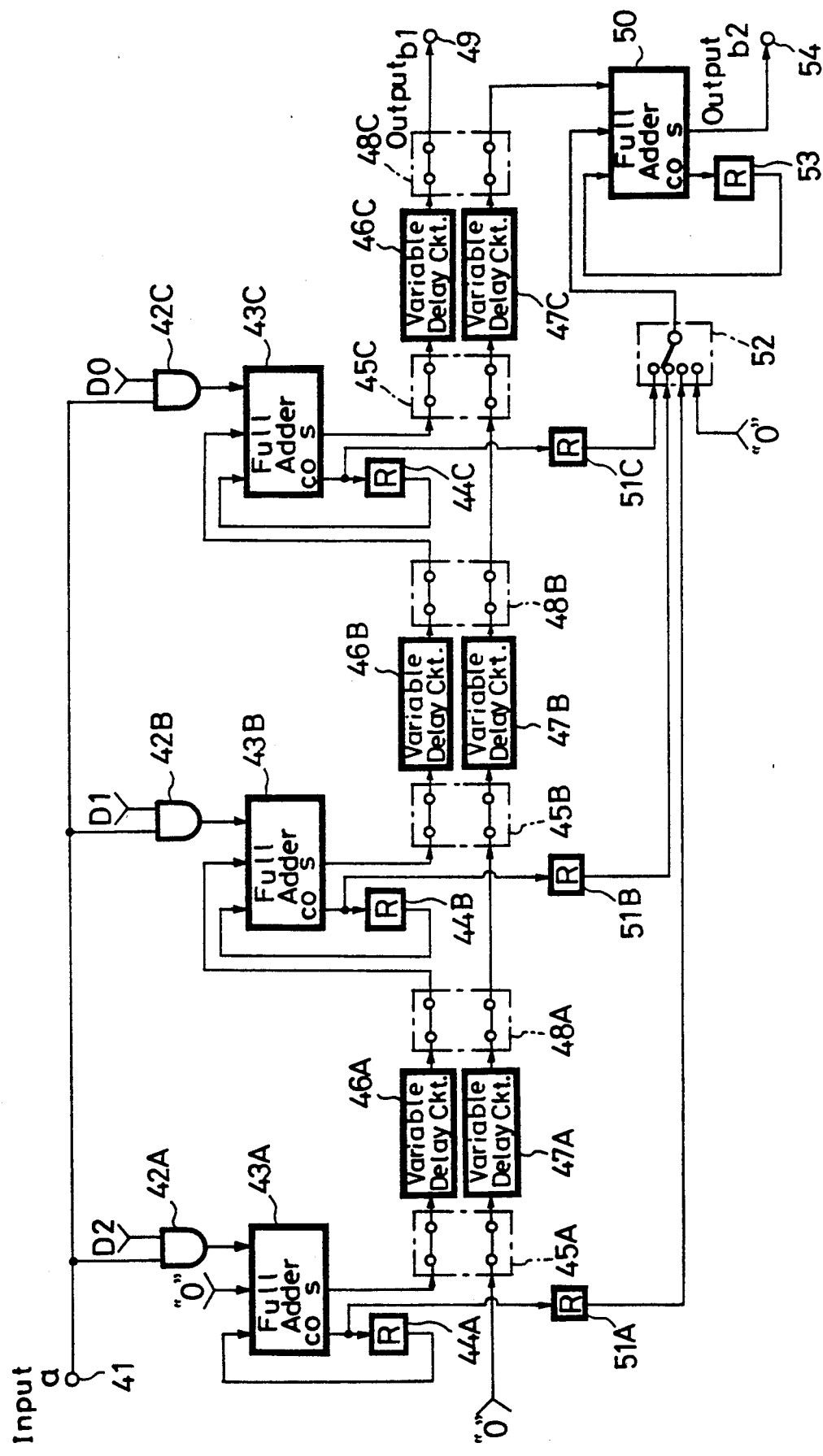
FIGS. 15 and 16 are respectively schematic block diagrams showing a third embodiment of the serial input multiplying circuit according to the present invention.

FIG. 15 shows the multiplying circuit of this embodiment. In FIG. 15, reference numeral 41 depicts an input terminal. Input data a is commonly supplied from the outside to one input terminal of AND gates 42A to 42C through the input terminal 41 and coefficient data D2 to D0 are supplied to the other input terminal of these AND gates 42A to 42C. In this case, as the input data a, input data words I, J, K, ... are serially and successively supplied to the input terminal 41 as shown in FIG. 17A. Outputs of these AND gates 42A through 42C are respectively supplied to first input terminals of full adders 43A to 43C, and carry outputs of these full adders 43A to 43C are respectively supplied through registers 44A to 44C, each provided as a unit delay element, to second input terminals of the same adder.

Two-input and two-output data exchanging or switching circuits 45A to 45C and 48A to 48C are adapted to directly output two inputs in parallel or to cross and output the two inputs in response to a control signal from the outside. Variable delay circuits 46A to 46C and 47A to 47C are each adapted to delay input data by delay times of 1 clock to 6 clocks in response to a control signal supplied thereto from the outside. Data "0" is supplied to a third input terminal of the full adder 43A of the maximum digit and a sum output terminal S of the full adder 43A is connected to a first input terminal of the data switching circuit 45A. Data "0" is supplied to a second input terminal of the data switching circuit 45A and first and second output terminals of the data switching circuits 45A are respectively connected through the variable delay circuits 46A and 47A to first and second input terminals of the data switching circuit 48A.

A first output terminal of the data switching circuit 48A is connected to a third input terminal of the full adder 43B of the middle digit, and a sum output terminal of the full adder 43B and a second output terminal of the data switching circuit 48A are respectively connected to the first and second input terminals of the data switching circuit 45B. The first and second output terminals of the data switching circuit 45B are respectively connected through the variable delay circuits 46B and 47B to the first and second input terminals of the data switching circuit 48B. The first output terminal of the data switching circuit 48B is connected to a third input terminal of the full adder 43C of the least significant digit, and a sum output terminal of the full adder 43C and the second output terminal of the data switching circuit 48B are respectively connected to first and second input terminals of the data switching circuit 45C.

First and second output terminals of the data switching circuit 45C are respectively connected through the variable delay circuits 46C and 47C to the first and second input terminals of the data switching circuit 48C. Then, data b1 developed at the first output terminal of the data switching circuit 48C is supplied to an output terminal 49, and the second output terminal of the data switching circuit 48C is supplied to a first input terminal of an additional full adder 50. Registers 51A to 51C are respectively provided as unit delay elements, and a data selector 52 is of a 4-input and 1-output type. Carry outputs of the full adders 43A to 43C are supplied respectively through the registers 51A to 51C to first through third input terminals of the data selector 52 and data "0" is supplied to a fourth input terminal of the data selector 52. An output of the data selector 52 is supplied to the second input terminal of the full adder 50, and a carry output of the full adder 50 is fed through a register 53, provided as the unit delay element, back to the third input terminal of the full adder 50. Then, a sum output b2 of the full adder 50 is supplied to an output terminal 54. The above-mentioned data b1 represents 6 low order bits in a series of product bits shown in FIG. 17B, and the data b2 represents 6 high order bits higher digit in a series of product shown in FIG. 17C.

Operation of the multiplying circuit shown in FIG. 15 will be described below assuming the coefficient C to be (110010). In this case, D0=D1=D2=1 is set, while the delay times of the variable delay circuits 46A, 47A are set to 1 clock, those of the variable delay circuits 46B, 47B are set to 3 clocks and those of the variable delay circuits 46C, 47C are set to 1 clock, respectively. In this embodiment, the 12 bits of the product O of the input data word I and the coefficient C are obtained during a series of 12 cycles, while 6 lower order bits of the product P of the next input data word J and the coefficient C are obtained in parallel during the 6 cycles with make up the second half of the 12 cycles. In this case, assuming that Ii represents one data bit input from the input terminal 41, then the AND gates 42A to 42C output data Ii . C which is regarded as one partial product of the input data I and the coefficient C.

During the first to sixth cycles which are the first half of the 12 cycles, data bits I0, I1, . . . , I5 are sequentially input to this multiplying circuit from the input terminal 41 of FIG. 15, and during this period, the data switching circuits 45A to 45C and the data switching circuits 48A to 48C are respectively set to directly output two input data in parallel as shown in FIG. 15. In that event, the full adders 43A to 43C are connected in a pipeline system and partial products of the input data and the coefficient C calculated by the AND gates 42A to 42C are sequentially supplied to the full adders 43A to 43C so that law order 6 bits O0, O1, . . . , O5 of the product O are serially output from the output terminal 49.

At the end of the sixth cycle, the high order 6 bits of the product O are expressed as redundant bits by the sum and the carry outputs from full adders 43A, 43B and 43C, as buffered in variable delay circuits in some cases. That is, a sum output for the 7th bit of the product O is still held in the variable delay circuit 46C, a sum output for the 8th to 10th bits of the product O is still held in the variable delay circuit 46B and a sum output for the 11th bit of the product O is still held in the variable delay circuit 46A, respectively. Further, the carry value for the 8th bit is still output as the carry output of the full adder 43C, the carry value for the 11th bit is still output as the carry output of the full adder 43B and the carry value for the 12th bit is still output as the carry output of the full adder 43A, respectively.

Accordingly, at the completion of the sixth cycle, the carry output (carry to the 8th bit) of the full adder 43C, the carry output (carry to the 11th bit) of the full adder 43B and the carry output (carry to the 12th bit) of the full adder 43A are respectively held in the registers 51C, 51B and 51A. The registers 51A to 51C continue to hold the above-mentioned values during the next period of 7th to 12th cycles, respectively.

Figure 16:
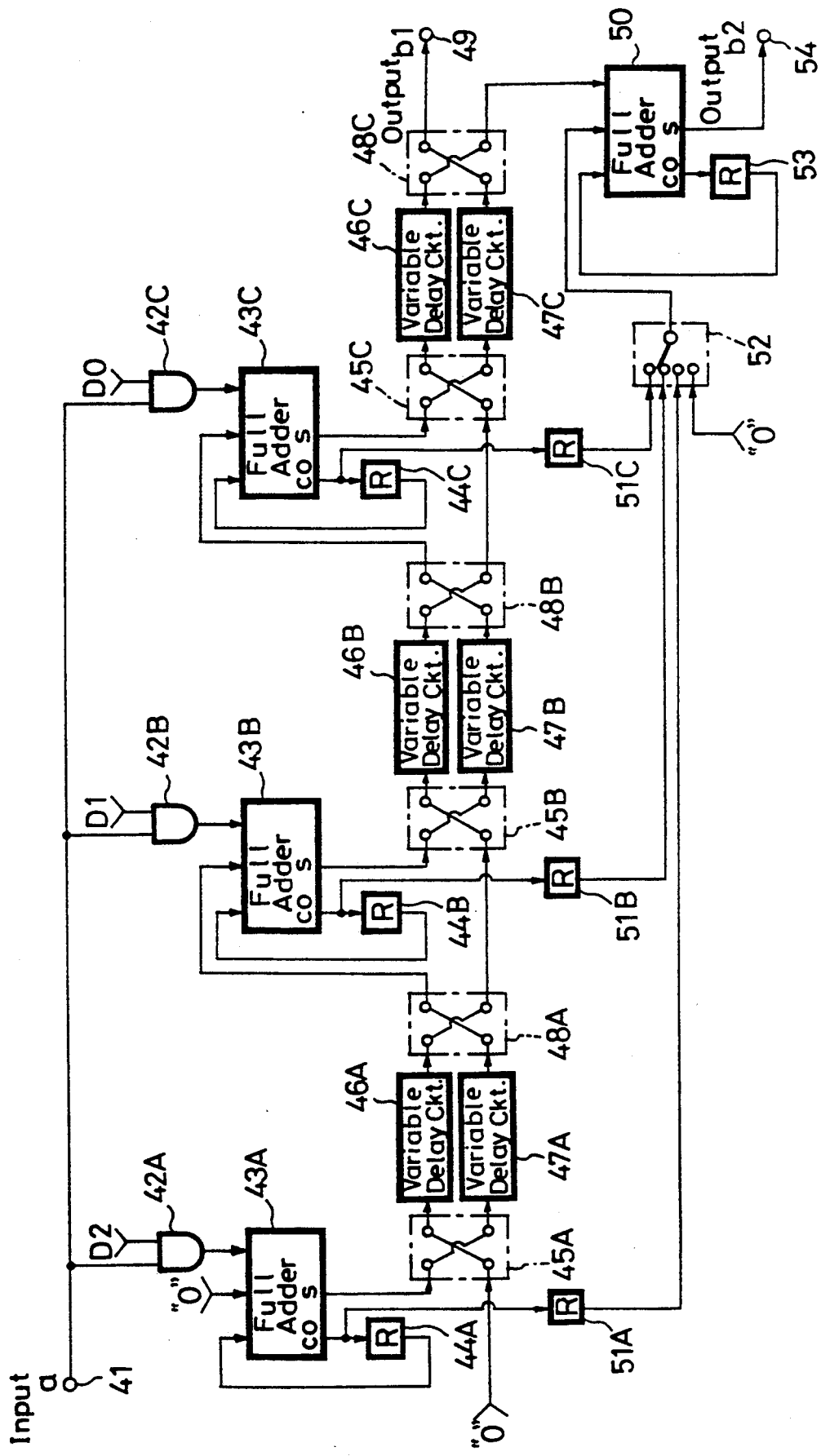

During the period of 7th to 12th cycles, as shown in FIG. 16, the data switching circuits 45A to 45C and the data switching circuits 48A to 48C respectively set to switch and then output their two input data. As a consequence, as shown in FIG. 16, the variable delay circuits 46A, 46B and 46C are connected serially so that sums for 7th bit to 11th bit data which are the redundant expressions of the product O are sequentially input to the first input terminal of the full adder 50. Meanwhile, data held by the registers 51C to 51A or data "0" are supplied through the data selector 52 to the second input terminal of the full adder 50, and the selection of data by the data selector 52 can be controlled from the outside.

Referring to FIG. 16, while the sum of 7th bit of data, which is the output of the serially connected variable delay circuits 46A to 46C, is input to the full adder 50 at the 7th cycle, the data selector 52 is controlled from the outside so as to supply data "0" to the full adder 50 because the carry is never added to the 7th bit. As a result, the addition is not carried out by the full adder 50 and the sum for 7th bit output from the variable delay circuits 46A to 46C is directly supplied to the output terminal 54 as the 7th product bit O6. Further, while the sum for the 8th bit of data output from the variable delay circuits 46A to 46C is input to the full adder 50 at the 8th cycle, the data selector 52 is controlled from the outside so as to input data held in the register 51C to the full adder 50 because the carry for the 8th bit held in the register 51C must be added to the above-mentioned value. As a consequence, the 8th bit sum and the carry to the 8th bit are added by the full adder 50 and the sum output of the added result is supplied to the output terminal 54 as the 8th bit O7 of the product O. Furthermore, a carry to the next bit produced by the addition of the full adder 50 is added to the next data via the register 53 during the next cycle.

Although sums for the 9th bit and the following bits are supplied to the full adder 50 from the variable delay circuits 46A to 46C during a period following the 9th cycle similarly, the 11th bit carry held in the register 51B and the 12th bit carry held in the register 51A must be added by the full adder 50 during the cycle in which the sum of 11th bit and the sum for the 12th bit are supplied. For this reason, the data selector 52 is controlled from the outside so as to supply the data held in the registers 51B and 51A to the full adder 50. As a result, during the period from the 7th cycle to the 12th cycle, O6 to O11, which are the 7th bit to 12th bit of the product O, are supplied to the output terminal 54.

In this embodiment, since the input data words I, J, K, . . . are successively supplied at timings shown in FIG. 17A, respective bits J0 to J5 of the next data word J are supplied to the input terminal 41 from the outside during the period of the 7th cycle to the 12th cycle. As is apparent from FIG. 16, the full adders 43A to 43C and the variable delay circuits 47A to 47C constitute a serial-input-output multiplying circuit for the low order bits which is adapted to process the input data word J. More specifically, during the 7th to 12th cycles, the variable delay circuits 46A to 46C are utilized for the input data word I and the variable delay circuits 47A to 47C are utilized for the input data word J. During the following 13th to 18th cycles, the connected states of the data switching circuits 45A to 45C and of the data switching circuits 48A to 48C are returned to those of FIG. 15, wherein the variable delay circuits 47A to 47C are utilized in order to obtain the 6 high order bits of a product corresponding to the input data word J and the variable delay circuits 46A to 46C are utilized in order to obtain the lower order 6 bits of a product corresponding to the next input successively input data words K. Thus, the variable delay circuits 46A to 46C and the variable delay circuits 47A to 47C are alternately utilized for data J, K, . . .

As described above, according to the third embodiment of the invention, the products O, P, Q, . . . , of input data words and the coefficient C are serially output through the two respective output terminals 49 and 54 in the separate form of the 6 law order bits and the 6 high order bits. There is then the advantage that the data words I, J, K, . . . can be serially and successively input and multiplied with the coefficient C. Further, since the successive multiplications are executed largely by switching the connected states of the data switching circuits 45A to 45C and 48A to 48C at every 6 cycles, the control of the switching circuits is rather simple. Furthermore, in accordance with this embodiment, since it is sufficient to utilize a number of full adders 43A to 43C corresponding to the number of bits which may become "1" even when the coefficient C is formed of many bits, there is then the advantage that the multiplying circuit of this embodiment can be miniaturized.

Figure 18:
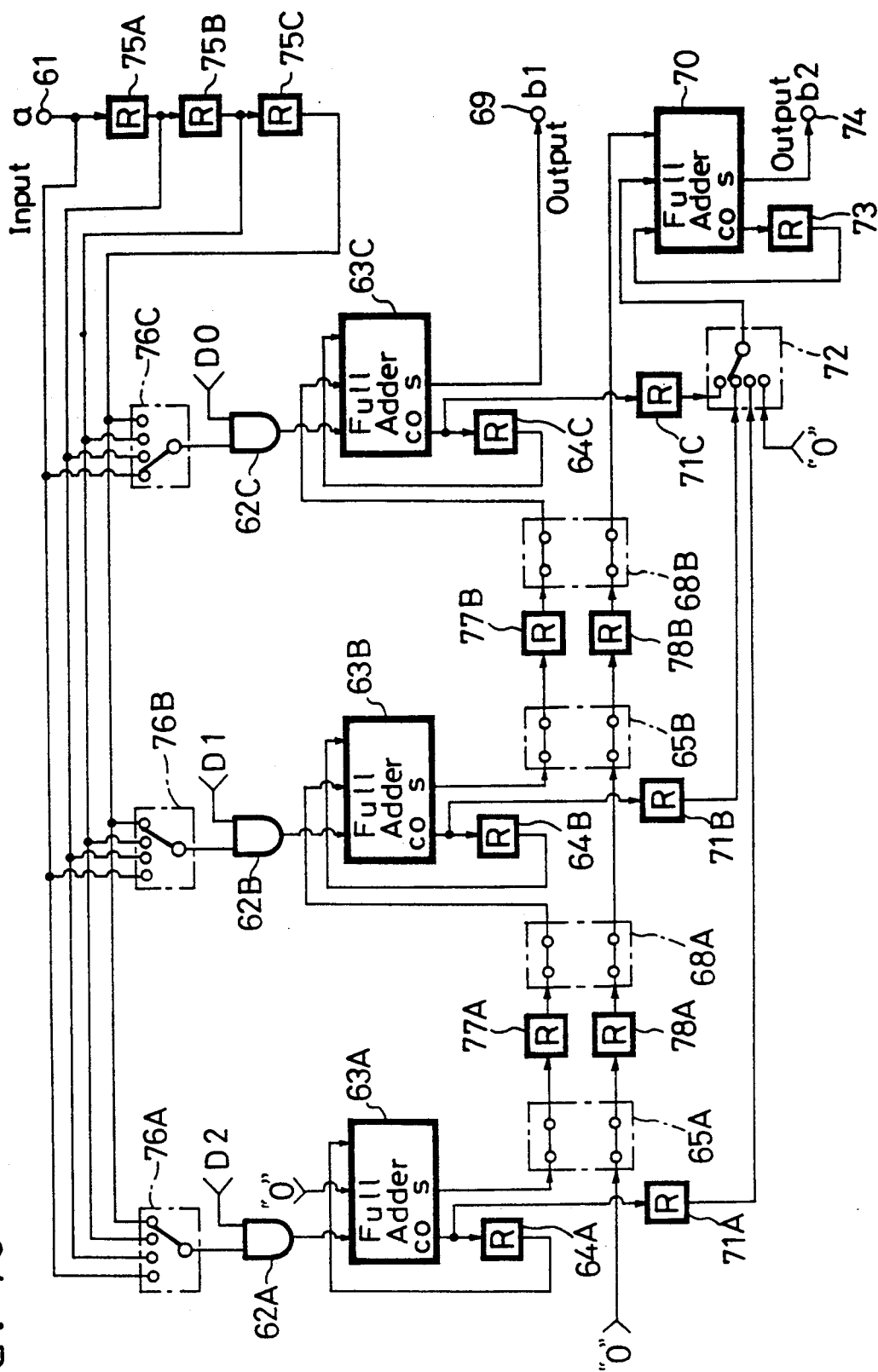
FIG. 18 is a schematic block diagram showing an arrangement of a modified example of the serial input multiplying circuit having a variable delay circuit according to the third embodiment of the present invention shown in FIG. 15.

While the variable delay circuits 46A to 46C and 47A to 47C are independently provided in the multiplying circuit shown in FIG. 15, FIG. 18 shows an arrangement of a modified example thereof in which these variable delay circuits are made common.

Referring to FIG. 18, it will be seen that registers 75A to 75C, each provided as a unit delay element, are successively connected to an input terminal 61, in that order. The input terminal 61 and output terminals of the registers 75A to 75C are commonly connected to first to fourth input terminals of data selectors 76A to 76C each of which is a four-input and one-output data selector, and output terminals of these data selectors 76A to 76C are respectively connected to one input terminals of AND gates 62A to 62C.

Further, first and second output terminals of a data switching circuit 65A are respectively connected to first and second input terminals of a data switching circuit 68A through registers 77A and 78A, each of which is provided as a unit delay element. First and second output terminals of a data switching circuit 65B are respectively connected to first and second input terminals of a data switching circuit 68B through registers 77B and 78B, each of which is provided as a unit delay element. A sum output terminal of a full adder 63C is connected to an output terminal 69 and a second output terminal of the data switching circuit 68B is connected to a first input terminal of a full adder 70. The rest of the arrangement of FIG. 18 is the same as that of FIG. 15 and therefore need not be described. While the multiplying circuit of FIG. 18 can perform the multiplication at the timings shown in FIGS. 17A to 17C in a serial input and output fashion, the number of the registers utilized in the multiplying circuit of FIG. 18 is reduced as compared with that of FIG. 15, so that the circuit scale of FIG. 18 is miniaturized further.

Figure 19:
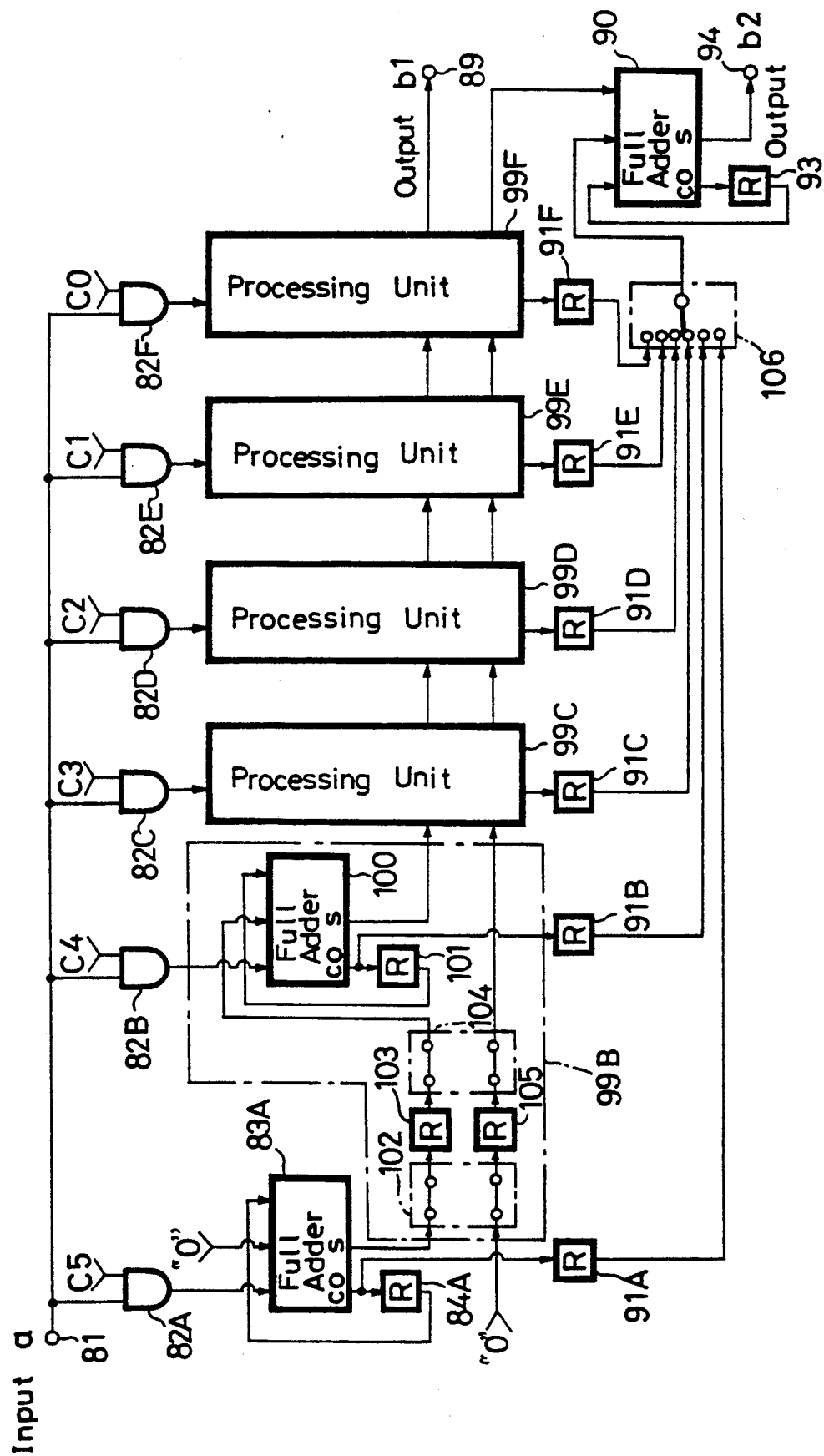
FIG. 19 is a schematic block diagram showing an arrangement of a fourth embodiment of the multiplying circuit according to the present invention.

A fourth embodiment of the present invention will be described with reference to FIG. 19. In this embodiment, the present invention is applied to a conventional serial input and output multiplying circuit without modification. The multiplying circuit of this embodiment is adapted to multiply the input data words I, J, ..., of word length of 6 bits serially input as shown in FIG. 19A with the coefficient C (=C5, C4, ..., C0) of word length of 6 bits to thereby serially output each bit of resultant products O, P, ..., . In FIG. 19, like parts corresponding to those of FIG. 15 are marked with the same or similar references.

Referring to FIG. 19, data a input to an input terminal 81 is commonly supplied to one input terminal of AND gates 82A to 82F and data C5 to C0 representing respective bits of the coefficient C are respectively supplied to the other input terminals of these AND gates 82A to 82F. An output of the AND gate 82A of the most significant digit is supplied to a first input terminal of a full adder 83A and data "0" is supplied to a second input terminal of the full adder 83A. A carry output f the full adder 83A is fed through a register 84A to a third input terminal of the full adder 83A, and the carry output of the full adder 83A is further supplied to a register 91A.

Then, outputs of the AND gates 82B to 82F are respectively supplied to processing units 99B to 99F, each of which has the same circuit configuration.

In the processing unit 99B, an output of the AND gate 82B is supplied to a first input terminal of a full adder 100 and a first output terminal of a data switching circuit 104, which will be described later, is connected to a second input terminal of the full adder 100. A carry output of the full adder 100 is fed through a register 101, provided as a unit delay element, back to a third input terminal of the full adder 100, and the carry output of the full adder 100 is further supplied to a register 91B. In FIG. 19, reference numerals 102 and 104 identify two-input and 2-output data switching circuits, and these data switching circuits 102 and 104 are adapted to directly output two input data in parallel or to switch the two input data in response to a control signal supplied thereto from the outside. A sum output of the full adder 83A and data "0" are respectively supplied to first and second input terminals of the data switching circuit 102, and first and second output terminals of the data switching circuit 102 are connected to the first and second input terminals of the data switching circuit 104 via registers 103 and 105, each of which is provided as a unit delay element. A sum output of the full adder 100 and data developed at the second output terminal of the data switching circuit 104 are supplied to a processing unit 99C of the next stage.

Similarly, two outputs of the processing units 99C to 99E are respectively supplied to the next processing units 99D to 9F, and carry outputs of full adders (not shown) provided within these processing units 99C to 99F are respectively supplied to registers 91C to 91F. Then, a sum output of a full adder (not shown) provided within the processing unit 99F of the final stage is supplied to an output terminal 89 as data b1 and output data developed at a second output terminal of a data switching circuit (not shown) of the processing unit 99F is supplied to a first input terminal of the full adder 90. Also, a carry output of the full adder 90 is fed through a register 93 back to a second input terminal of the full adder 90. In FIG. 19, reference numeral 106 depicts a 6-input and one-output data selector and data held in the registers 91A to 91F are respectively supplied to six input terminals of the data selector 106. An output of the data selector 106 is supplied to the third input terminal of the full adder 90 and a sum output of the full adder 90 is supplied to an output terminal 94 as data b2.

Also in this embodiment, as shown in FIG. 17A, input data words I, J, K, ... of 6 bits are serially supplied to the input terminal 81 and the data switching circuits 102 and 104 in the processing units 99B to 99F are switched at every 6 cycles, whereby the products O, P, Q, ... are respectively and serially output from the output terminals 89 and 94 as shown in FIG. 17B and 17C. However, the circuit configuration of FIG. 19 needs the full adders of number substantially the same as that of the word length of the coefficient C and therefore the circuit scale of the multiplying circuit shown in FIG. 19 is large as compared with that of FIG. 15.

In the multiplying circuit of FIG. 15, the word length of the input data is 6 bits and the word length of output data is 12 bits, that is, the output data has the word length twice as large as the word length of the input data with the result that the variable delay circuits 47A to 47C are further provided in parallel to the variable delay circuits 46A to 46C, respectively. On the other hand, when the word length of input data is 6 bits and the word length of the coefficient C is 12 bits, then the word length of the output data becomes 18 bits. In that case, since the word length of the output data is three times as long as that of the input data, it is necessary to provide a third group of variable delay circuits in parallel to the variable delay circuits 47A to 47C.

While the multiplying circuits of FIGS. 15 and 18 are applied to the case such that the coefficient C involves three "1", or fewer, the multiplying circuits of FIGS. 15 and 18 can be expanded with ease for the general case in which the word length of the coefficient C is m bits and the coefficient C involves k "1"s. Similarly, the multiplying circuit of FIG. 19 can be generally expanded for the case in which the word length of the coefficient C is m bits.

According to the present invention, since the products of input data words and the predetermined coefficient are output from the respective sum output terminals of the full adder for the least significant digit and the additional full adder, input data can be input successively and the processing speed can be increased.

Although preferred embodiments of the invention have been described herein with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A serial-input-output multiplying circuit for multiplying an input number by a coefficient to form a product number, comprising:
   a serial input terminal for serially receiving bits of said input number;
   a serial output terminal for serially outputting bits of said product number;
   a plurality of AND gates, each having a first input connected to said input terminal, and a second input which receives a signal representative of a respective bit of said coefficient, each AND gate thereby providing at its output a partial product of said input number and said coefficient;
   a like plurality of full adders for combining said partial products, said adders being arranged in a series including a most significant bit (MSB) adder as the first adder of the series and a least significant bit (LSB) adder as the last adder of the series, each adder of the series having a first input connected to the output of a respective one of said AND gates;
   a like plurality of unit delay elements each connected between a carry output and a second input of a respective one of said full adders; and
   a like plurality of variable delay circuits, one of the variable delay circuits connecting a sum output of said least significant bit (LSB) adder to said serial output terminal and the other variable delay circuits each connecting a sum output of a respective one of the other full adders to a third input of a next full adder of said series; a third input of said most significant bit (MSB) adder receiving a data value "0".

2. A serial-input-output multiplying circuit for multiplying an input number by a coefficient to form a product number, comprising:
   a serial input terminal for serially receiving bits of said input number;
   a serial output terminal for serially outputting bits of said product number;
   a variable delay circuit having an input coupled to said serial input terminal and plural groups of outputs and including a plurality of unit delay elements connected in cascade; said input being connected to an input of a first of said unit delay elements and to a respective output of each of said groups of outputs; each other output of each of said groups of outputs being connected to an output of a respective one of said unit delay elements;
   a plurality of means for selecting a delay to be provided by said variable delay circuit, each connected to a respective one of said groups of outputs;
   a plurality of AND circuits each having one input connected to a respective one of said means for selecting a delay and receiving at its other input a signal representative of a respective bit of said coefficient;
   a plurality of full adders arranged in a series including a mot significant bit (MSB) adder as the first adder of the series and a least significant bit (LSB) adder as the last adder of the series, each adder of the series having a first input connected to receive an output from a respective one o said AND circuits, said least significant bit (LSB) adder having its sum output connected to said serial output terminal;
   a plurality of unit delay elements each connected between a carry output and a second input of a respective one of said full adders; and
   another plurality of unit delay elements each connected between a sum output of a respective one of said full adders and a third input of a next full adder of said series; a third input of said most significant bit (MSB) adder receiving a data value "0".

3. A serial-input-output multiplying circuit for multiplying an input number by a predetermined coefficient to form a product number, comprising:
   a serial input terminal for serially receiving bits of said input number;
   a first serial output terminal for serially outputting low order bits of said product number;
   a second serial output terminal for serially outputting high order bits of said product number;
   a plurality of AND gates, each having a first input connected to said serial input terminal, and a second input which receives a signal representative of a respective bit of said predetermined coefficient, each AND gate thereby providing at its output a partial product of said input number and said predetermined coefficient;
   a like plurality of full adders for combining said partial products, said adders arranged in a series including a most significant bit (MSB) adder as the first adder of the series and a least significant bit (LSB) adder as the last adder of the series, each adder of the series having a first input connected to the output of a respective one of said AND gates, the least significant bit (LSB) adder having its sum output connected to said first serial output terminal to provide said low order bits;
   a like plurality of unit delay elements each connected between a carry output and a second input of a respective one of said full adders;
   a data selector;
   a like plurality of data storage elements each connected between a carry output of a respective one of said plurality of full adders and a respective input of said data selector;

a plurality of delay circuits each connecting a sum output of a respective one of said full adders other than said least significant bit (LSB) adder to a third input of a next full adder of said series; a third input of said most significant bit (MSB) adder receiving a data value "0";

a plurality of serially connected storage circuits for storing respective sums output from said plurality of full adders; and an additional full adder with a first input connected to an output of said plurality of serially connected storage circuits for receiving said sums output from said plurality of full adders, a second input connected to an output of said data selector for selectively receiving a carry output from a selected one of said plurality of full adders, its carry output connected through a unit delay element to a third its inputs and its sum output connected to said second serial output terminal to provide said high order bits.

4. A serial-input-output multiplying circuit according to claim 3; wherein said data selector has an input which receives a data value "0" and is selectively connected to said second input of said additional full adder.

* * * * *